United States Patent
Kruglick

(10) Patent No.: US 9,652,272 B2
(45) Date of Patent: *May 16, 2017

(54) ACTIVATING CONTINUOUS WORLD SWITCH SECURITY FOR TASKS TO ALLOW WORLD SWITCHES BETWEEN VIRTUAL MACHINES EXECUTING THE TASKS

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 345 days.

This patent is subject to a terminal disclaimer.

(21) Appl. No.: 14/301,172

(22) Filed: Jun. 10, 2014

(65) Prior Publication Data

US 2014/0304704 A1    Oct. 9, 2014

Related U.S. Application Data

(63) Continuation of application No. 13/512,554, filed as application No. PCT/US2012/022636 on Jan. 26, 2012, now Pat. No. 8,789,047.

(51) Int. Cl.
*G06F 9/455* (2006.01)
*H04L 29/08* (2006.01)

(52) U.S. Cl.
CPC ...... *G06F 9/45533* (2013.01); *G06F 9/45558* (2013.01); *H04L 67/10* (2013.01); *G06F 2009/45587* (2013.01)

(58) Field of Classification Search
CPC ............ G06F 9/45533; G06F 9/45558; G06F 2009/45587; H04L 67/10
See application file for complete search history.

(56) References Cited

U.S. PATENT DOCUMENTS

| | | | |
|---|---|---|---|
| 7,415,708 B2 * | 8/2008 | Knauerhase | G06F 9/4881 718/1 |
| 7,529,897 B1 | 5/2009 | Waldspurger et al. | |

(Continued)

FOREIGN PATENT DOCUMENTS

| | | |
|---|---|---|
| KR | 1020120000889 A | 1/2012 |
| WO | PCT/US2012/022636 | 8/2013 |

OTHER PUBLICATIONS

International Searching Authority, International Search Report and Written Opinion for International Patent Application No. PCT/US2012/022636, May 8, 2012, 11 pages.

(Continued)

*Primary Examiner* — James J Lee
(74) *Attorney, Agent, or Firm* — Jensen & Puntigam, P.S.

(57) ABSTRACT

Technologies related to continuous world switch security are generally described. In some examples, a world switch indicator may indicate whether continuous world switch security is on or off for a cloud customer. A hypervisor world switch security setting may be activated and deactivated, according to the world switch indicator, to optionally allow world switches and not context switches between virtual machines executed by a cloud server. Continuous world switch security may optionally be controlled by a cloud customer. Load balancing, cloud customer billing and other techniques are also disclosed to accommodate the activation/deactivation of continuous world switch security.

20 Claims, 7 Drawing Sheets

(56) References Cited

U.S. PATENT DOCUMENTS

| | | | |
|---|---|---|---|
| 7,937,700 B1* | 5/2011 | Klaiber | G06F 9/45533 711/106 |
| 8,352,670 B2 | 1/2013 | Serebrin | |
| 2003/0101440 A1* | 5/2003 | Hardin | G06F 9/4812 717/148 |
| 2005/0081212 A1* | 4/2005 | Goud | G06F 9/45558 718/107 |
| 2005/0132363 A1* | 6/2005 | Tewari | G06F 9/45558 718/1 |
| 2005/0132364 A1* | 6/2005 | Tewari | G06F 9/5077 718/1 |
| 2005/0223220 A1* | 10/2005 | Campbell | G06F 9/45537 713/164 |
| 2006/0136922 A1 | 6/2006 | Zimberg | |
| 2006/0294519 A1* | 12/2006 | Hattori | G06F 9/45558 718/1 |
| 2007/0260838 A1* | 11/2007 | Schwemmlein | G06F 21/52 711/163 |
| 2009/0187698 A1 | 7/2009 | Serebrin | |
| 2009/0222880 A1* | 9/2009 | Mayer | G06F 21/6218 726/1 |
| 2009/0276771 A1 | 11/2009 | Nickolov | |
| 2009/0320048 A1* | 12/2009 | Watt | G06F 9/4812 719/319 |
| 2010/0313201 A1 | 12/2010 | Warton | |
| 2011/0010707 A1 | 1/2011 | Serebrin | |
| 2011/0107426 A1 | 5/2011 | Yen | |
| 2011/0126139 A1* | 5/2011 | Jeong | G06F 3/0482 715/767 |
| 2011/0145814 A1 | 6/2011 | Mangione-Smith | |
| 2011/0161955 A1 | 6/2011 | Woller | |
| 2011/0173363 A1 | 7/2011 | Conti | |
| 2011/0302415 A1 | 12/2011 | Ahmad | |
| 2012/0130874 A1* | 5/2012 | Mane | G06Q 30/04 705/34 |
| 2013/0031374 A1* | 1/2013 | Thom | G06F 21/57 713/189 |
| 2013/0060959 A1 | 3/2013 | Taveau | |
| 2013/0117752 A1* | 5/2013 | Li | G06F 9/5066 718/102 |
| 2013/0174144 A1 | 7/2013 | Cheng | |
| 2013/0198743 A1 | 8/2013 | Kruglick | |

OTHER PUBLICATIONS

McMillan, Researchers find a new way to attack the cloud: 'Side-channel' attack techniques could lead to more serious problems, Computerworld Article, Sep. 3, 2009, 3 pages.

Osvik, Cache Attacks and Countermeasures: the Case of AES, Article, Nov. 20, 2005, 25 pages.

Percival, Cache Missing for fun and Profit, BSDCan Article, 2005, 13 pages.

Ristenpart, Hey, You, Get Off of My Cloud: Exploring Information Leakage in Third-Party Compute Clouds, Article, Proceedings of the 16th ACM Conference on Computer and Communications Security, Nov. 9, 2009, 14 pages.

Open Data Center Alliance, Open Data Center Alliance Usage: Provider security Assurance, Article, 2011, 14 pages.

Biswas, Hardware Virtualization Support in INTEL, AMD and IBM Power Processors, IJCSIS Article, Aug. 2009, 6 pages.

AMD, AMD "Pacifica" Virtualization Technology, Slide Presentation, Jun. 16, 2010, 18 pages.

Intel, Hardware-Assisted Virtualization Technology: Improving the fundamental flexibility and robustness of traditional software-based virtualization solutions, Webpage accessed on Dec. 11, 2013, 3 pages.

Morel, C4[1] Morel: Virtualization Vivisection, Webpage including video of presentation and comments, Feb. 22, 2008, 3 pages.

Wikipedia, Data Loss Prevention Software, Web Wiki Article, accessed on Dec. 16, 2013, 4 pages.

* cited by examiner

CLOUD CUSTOMER UI 500

CONTINUOUS WORLD SWITCH SECURITY CONTROL 501 | PRICE 510

○ ● ENABLE CONTINUOUS WORLD SWITCH SECURITY – ALL TASKS | $50
ON OFF

CONTINUOUS WORLD SWITCH SECURITY CONTROL 502

○ ● ENABLE CONTINUOUS WORLD SWITCH SECURITY ONLY FOR TASK TYPE I | $25
ON OFF

CONTINUOUS WORLD SWITCH SECURITY CONTROL 503

○ ● ENABLE CONTINUOUS WORLD SWITCH SECURITY ONLY FOR TASK TYPE II | $25
ON OFF

CLOUD CUSTOMER CONTROL 504

○ ● ALLOW TASKS TO SHARE CLOUD SERVERS WITH VMs REQUIRING | -$25
ON OFF CONTINUOUS WORLD SWITCH SECURITY. WARNING: TASK PROCESSING
MAY BE SLOWER IN SOME CONDITIONS.

NEXT

LINK 551                                                              CLOUD CUSTOMER UI 550

CLICK HERE TO DOWNLOAD SECURITY CERTIFICATE DEMONSTRATING YOUR TASKS ARE
SUBJECT TO CONTINUOUS WORLD SWITCH SECURITY

FIG. 5

ACTIVATING CONTINUOUS WORLD SWITCH SECURITY FOR TASKS TO ALLOW WORLD SWITCHES BETWEEN VIRTUAL MACHINES EXECUTING THE TASKS

CROSS-REFERENCE TO RELATED APPLICATIONS

This application is a continuation application which claims priority under 35 U.S.C. §120 to U.S. patent application Ser. No. 13/512,554, entitled "ALLOWING WORLD SWITCHES BETWEEN VIRTUAL MACHINES VIA HYPERVISOR WORLD SWITCH SECURITY SETTING", filed on May 29, 2012, now U.S. Pat. No. 8,789,047, which in turn is a U.S. National Stage filing under 35 U.S.C. §371 of International Application No. PCT/US12/022636, filed on Jan. 26, 2012, entitled "DATA CENTER WITH CONTINUOUS WORLD SWITCH SECURITY". The prior applications are incorporated by reference in their entirety.

BACKGROUND

Unless otherwise indicated herein, the materials described in this section are not prior art to the claims in this application and are not admitted to be prior art by inclusion in this section.

Virtual machines have become a core tool in data centers. They allow load balancing and separation between users as well as allowing different users to run different operating systems and releases on same hardware.

However, the existence of multiple virtual machines on the same hardware presents security risks. For example, in one security risk scenario, an attacker may get a virtual machine co-located with a target, e.g., using cloud cartography methods such as those disclosed in T. Ristenpart et al., "*Hey, You, Get Off of My Cloud: Exploring Information Leakage in Third-Party Compute Clouds,*" in Proceedings of the 16th ACM Conference on Computer and Communications Security, 2009, pages 199-212. The attacker may employ side channel attacks to extract data from co-located processes. These side channel attacks take advantage of information leakage due to the sharing of physical resources.

Such example attacks may take advantage of processor data caches and may enable extraction, for example, of encryption/decryption keys. See C. Percival, "*Cache Missing for Fun and Profit,*" BSDCan 2005; D. A. Osvik et al., "*Cache Attacks and Countermeasures: The Case of AES,*" Topics in Cryptology—CT-RSA 2006, The Cryptographers Track at the RSA Conference 2006. In an example attack, data streams are extracted from shared memory or caches by timing cache accesses to detect evictions. Such methods do not require access to any common resources, however shared resource access makes such methods much more powerful. See C. Percival, "*Cache Missing for Fun and Profit,*" BSDCan 2005. Other researchers have found that caches provide information on keystroke timing to extract passwords and/or count users. See R. McMillan, "*Researchers Find a New Way to Attack the Cloud: 'Side-channel' attack techniques could lead to more serious problems,*" COMPUTER WORLD, Sep. 3, 2009.

SUMMARY

The present disclosure generally describes technologies including devices, methods, and computer readable media relating to data centers with continuous world switch security. Some example data centers may comprise one or more interconnected servers configured to provide cloud services. A data center may comprise digital administrative records comprising a world switch indicator associated with one or more cloud customers. The data center may comprise a task launcher configured to check the world switch indicator when launching a task on behalf of a cloud customer. In response to an indication by the world switch indicator that continuous world switch security on, the task launcher may be configured to activate a hypervisor world switch security setting, also referred to herein as a hypervisor setting, for a virtual machine managed by a hypervisor of one or more cloud servers. The hypervisor may be configured to allow world switches, and not context switches, between virtual machines when the hypervisor setting is on. When the hypervisor setting is off, the hypervisor may be configured to allow world switches and/or context switches between virtual machines.

Example data centers may include, inter alia, a load balance manager configured to accommodate continuous world switch security. For example, a load balance manager may be configured to allocate additional data center processing resources to cloud customers and/or virtual machines including tasks for which continuous world switch security is on. A load balance manager may be configured to group tasks for which continuous world switch security is on in one or more same servers. A load balance manager may be configured to allocate tasks for which continuous world switch security is on in servers comprising hardware virtualization assistance, to better support additional processor activity due to world switching.

Example data centers may also employ conditional continuous world switch security, for example by including a task launcher configured to check at least one condition, in addition to the world switch indicator, prior to activating a hypervisor setting. The hypervisor setting may be activated when the at least one condition is satisfied. For example, a multiple cloud customer condition may be used, wherein when virtual machines presently executable by a server are associated with more than one cloud customer, the hypervisor setting is activated, thereby improving security. However when virtual machines presently executable by a server are associated with just one cloud customer (or in some embodiments, trusted cloud customers) the hypervisor setting may be not activated, or may otherwise be deactivated, thereby improving performance. Also, example data centers may be configured to communicate continuous world switch security information to a billing subsystem to charge cloud customers appropriately for a higher and more secure level of service.

Some example data center methods disclosed herein may be performed with one or more interconnected servers configured to provide cloud services. Example data center methods may comprise maintaining digital administrative records comprising a world switch indicator associated with one or more cloud customers, and checking the world switch indicator when launching a task on behalf of a cloud customer. In response to an indication by the world switch indicator that continuous world switch security is on, a hypervisor setting may be activated for a virtual machine including the task. When continuous world switch security is on, world switches, and not context switches, may be allowed between a virtual machine including the task and other virtual machines executable by the server.

Some example cloud servers may be configured to execute tasks within one or more virtual machines. A cloud server may comprise one or more processor cores, each having a processor and a cache memory. A hypervisor may be executable by the processor cores, and may be configured to manage execution of virtual machines by the cloud server. The hypervisor may be configured to initiate context switches and world switches between virtual machines. The hypervisor may be configured to implement a hypervisor setting associated with a task by allowing world switches, and not context switches, between a virtual machine including the task and other virtual machines when the hypervisor setting is on. Otherwise, when hypervisor setting is off, the hypervisor may be configured to allow world switches and context switches.

Example cloud servers may also comprise a task launcher configured to activate a hypervisor setting in response to a world switch indicator associated with a cloud customer. A task launcher may be configured to provide conditional continuous world switch security by checking at least one condition, in addition to the world switch indicator, prior to activating the hypervisor setting, and activating the hypervisor setting when the condition is satisfied. For example, a multiple cloud customer condition may be applied wherein a hypervisor setting is activated when virtual machines presently executable by a cloud server are associated with more than one cloud customer. The hypervisor setting may be not activated, or may be deactivated, in the hypervisor when virtual machines presently executable by a cloud server are associated with one cloud customer, or a subset of trusted cloud customers. A task launcher may also be configured to communicate continuous world switch security information to a billing subsystem.

Example processor cores within a cloud server may have a processor state defined at least in part by a state of a processor cache memory. Context switches between virtual machines may allow at least a portion of a processor state associated with a first virtual machine to remain during execution of a next virtual machine. In contrast, world switches between virtual machines may eliminate the processor state associated with the first virtual machine when switching to execution of the next virtual machine.

Example hypervisors within a cloud server may be configured to implement a hypervisor setting by including a trap handler. A trap handler may be configured to detect a trap-list processor command by referring to trap list, and to trap a trap-list processor command from a virtual machine, thereby initiating a world switch. A trap handler may also be configured to detect, during execution of a first virtual machine, a next virtual machine processor command from a next virtual machine, and to refer to a hypervisor setting for one or more of the first virtual machine and the next virtual machine, and to trap the next virtual machine processor command when the hypervisor setting is activated for one or more of the first virtual machine and the next virtual machine. Example hypervisors may also be configured to initiate world switches between virtual machines using a hardware virtualization assistance tool provided by a processor core.

Example cloud servers may include a load balance manager configured to accommodate continuous world switch security, as described above in connection with the example data center.

Some example methods performed by a cloud server may comprise detecting, by the cloud server, a world switch indicator associated with a task; activating, by the cloud server, a hypervisor setting in a hypervisor in response to detecting that the world switch indicator requires world switches, and not context switches, between a virtual machine including the task and other virtual machines executable by the cloud server; and when the hypervisor setting is activated, allowing, by the hypervisor, world switches, and not context switches, between a virtual machine including the task and other virtual machines executable by the cloud server. Detecting a world switch indicator may be performed by a task launcher by referencing administrative records associated with a cloud customer. The task launcher may also implement conditional continuous world switch security for example by checking at least one condition in addition to the world switch indicator, prior to activating the hypervisor setting, and activating the hypervisor setting when the condition is satisfied. The task launcher may also implement communicating continuous world switch security information to a billing subsystem. When available, world switches may be performed using a hardware virtualization assistance tool provided by one or more of the processor cores to initiate world switches between virtual machines.

Some example methods may also comprise detecting, during execution of a first virtual machine, a next virtual machine processor command from a next virtual machine, and referring to a hypervisor setting for either or both of the first virtual machine and the next virtual machine, and trapping the next virtual machine processor command when the hypervisor setting is activated for either or both of the first virtual machine and the next virtual machine.

Some example methods may also comprise load balancing using techniques disclosed above, for example by allocating additional processing resources including one or more of processing time, processor cores, and memory resources to a virtual machine including tasks for which continuous world switch security is on, and/or grouping tasks for which continuous world switch security is on.

Some example computer readable media may include computer executable instructions implementing a hypervisor. The hypervisor may be configured to initiate context switches and world switches between virtual machines executable by one or more processor cores included in a cloud server. The hypervisor may be configured to implement a hypervisor setting associated with a task, so that when continuous world switch security is on, the hypervisor allows world switches, and not context switches, between a virtual machine including the task and other virtual machines executable by the cloud server, and when continuous world switch security is off, the hypervisor allows world switches and context switches between virtual machines. Example computer readable media may also include, inter alia, instructions implementing a task launcher, a trap handler, and/or a load balance manager as described above.

Some example devices may include ecommerce servers configured to interact with cloud customers. Ecommerce servers may include a processor, a memory, a communication device, and a cloud customer Cloud Management Interface (CMI) loadable in the memory and executable by the processor. The CMI may be configured to provide a cloud customer User Interface (UI) via the communication device. The cloud customer UI may comprise a continuous world switch security control configured to receive a continuous world switch security activation command associated with tasks to be performed by cloud servers. In response to receiving the activation command, the CMI may be configured to arrange the cloud servers to allow world switches, and not context switches, between a virtual machine executing the tasks and other virtual machines executable by the cloud servers.

In some example ecommerce servers, a received continuous world switch security activation command may be associated with a cloud customer and all tasks to be performed by cloud server on behalf of the cloud customer. In some ecommerce servers, a received continuous world switch security activation command may apply to subsets of tasks to be performed on behalf of a cloud customer, or to tasks performed under certain specified conditions, e.g., to tasks performed on a cloud server that also executes virtual machines on behalf of different cloud customers.

Arranging cloud servers to allow world switches and not context switches may comprise generating an administrative record and/or a digital certificate associated with a cloud customer, the administrative record and/or digital certificate including a world switch indicator. Arranging cloud servers to allow world switches and not context switches may also comprise activating, by a task launcher executed by the cloud servers, the hypervisor setting in a hypervisor configured to manage execution of virtual machines by the cloud servers.

Example ecommerce servers may be configured to provide additional aspects of a cloud customer UI, e.g., price information for activating continuous world switch security, and a cloud customer control configured to allow tasks associated with a cloud customer to execute on a server that also executes tasks having an activated hypervisor setting. Ecommerce servers may also generate and/or provide security certifications to cloud customers who activate continuous world switch security.

Some example methods performed with an electronic commerce server may comprise providing, by the electronic commerce server, a cloud customer UI comprising a continuous world switch security control configured to receive a continuous world switch security activation command associated with tasks to be performed by cloud servers, and in response to receiving an activation command, configuring the cloud servers to allow world switches, and not context switches, between a virtual machine executing the cloud customer's tasks and other virtual machines executable by the cloud servers. Configuring the cloud servers to allow world switches may comprise generating an administrative record and/or digital certificate associated with a cloud customer, the administrative record and/or digital certificate including a world switch indicator. Example methods may also include cloud customer billing and additional functions and features implemented by ecommerce servers described herein. Example methods may also include load balancing as described above, and/or configuring a cloud load balance manager to accommodate received world switch security preferences, e.g., by allocating additional processing resources to virtual machines including tasks for which a hypervisor setting is on; allocating tasks for which continuous world switch security is on to servers comprising a hardware virtualization assistance tool provided by one or more processor cores, and/or allocating tasks associated with one or more cloud customers having continuous world switch security to same cloud servers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 is a diagram illustrating example elements of a cloud customer UI;

DETAILED DESCRIPTION

Figure 1:
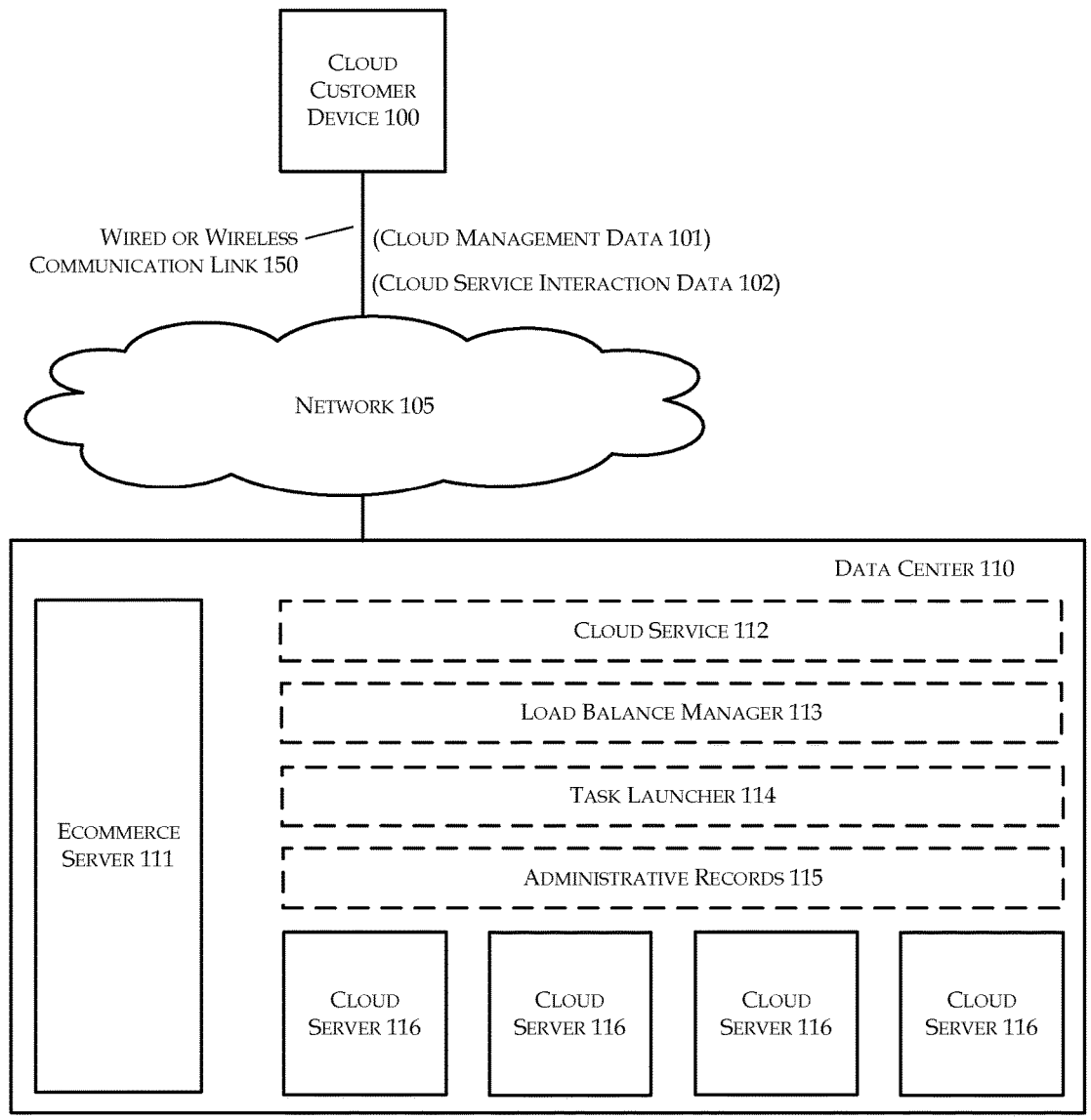
FIG. 1 is a block diagram illustrating an example data center comprising cloud servers and configured to provide a cloud service via a network connecting the data center and a cloud customer device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to technologies including data centers and methods, devices, and/or computer readable media deployed therein relating to continuous world switch security. A world switch indicator may indicate whether continuous world switch security is on or off for a cloud customer. A hypervisor setting may be activated and deactivated, according to the world switch indicator, to optionally allow world switches and not context switches between virtual machines executed by a cloud server. Continuous world switch security may optionally be controlled by a cloud customer. Load balancing, cloud customer billing and other techniques are also disclosed to accommodate activation/deactivation of continuous world switch security. Continuous world switching provides enhanced security at least in part because context switches between virtual machines may leave aspects of processor state in place, thereby providing an opportunity for attack, by code executed within one virtual machine, to gain access to information from another virtual machine. In contrast, world switches may substantially eliminate processor state associated with a virtual machine, thereby reducing vulnerability to attacks.

FIG. 1 is a diagram illustrating an example data center 110 comprising cloud servers 116 and configured to provide a cloud service 112 via a network 105 connecting data center 110 and a cloud customer device 100, arranged in accordance with at least some embodiments of the present disclosure. A data center according to FIG. 1 may comprise an ecommerce server 111 and cloud servers 116. One or more of cloud servers 116 and/or other data center devices may be configured to provide cloud service 112, a load balance manager 113, a task launcher 114, and administrative records 115. Data center 110 and cloud customer device 100 may be coupled to one another via a network 105. Data center 110 and cloud customer device 100 may each be coupled to network 105 via a wired or wireless communication link 150. Cloud management data 101 and cloud service interaction data 102 may be exchanged between data center 110 and cloud customer device 100.

The term "cloud server" as used herein refers to any computing device in a data center that performs one or more tasks on behalf of cloud customers. A cloud server may perform tasks for cloud customers exclusively, or may perform other, non-cloud customer related tasks such as data center administration tasks, or other tasks, in addition to the cloud customer tasks. The terms "cloud server" and "cloud customer" are not limited to publically offered cloud service embodiments. It will be appreciated that while some cloud services are offered publically, such as cloud services currently offered by MICROSOFT®, IBM®, AMAZON®, APPLE®, and ORACLE®, other cloud services are private in nature, such as cloud services that are privately available to employees and/or operational units of institutions, enterprises including those listed above as well as many others, or government agencies. In this regard, a cloud customer is not necessarily a paying cloud customer. For example, a cloud customer may be an employee or other person using the data center 110 to perform computing tasks on the cloud customer's behalf.

Data center 110 may be configured to receive, via network 105, cloud management data 101, and/or cloud service interaction data 102. Cloud management data 101 may comprise, e.g., commands produced via cloud customer interactions with a cloud customer UI. Ecommerce server 111 may be configured to provide the cloud customer UI to cloud customer device 100. The cloud customer UI may comprise cloud customer account management features, such as features enabling activation of continuous world switch security as well as for example updating a cloud customer's profile information, desired cloud services, desired level of security, and billing information.

Cloud service interaction data 102 may comprise, e.g., cloud customer requests to cloud service 112. Cloud service 112 may be configured to execute tasks on behalf of cloud customers, as requested in cloud service interaction data 102. Cloud service 112 may be configured to execute a task for example by requesting task launcher 114 to configure a virtual machine with application(s) and data configured to execute the task. Load balance manager 113 may determine which of cloud servers 116 to use in executing the virtual machine configured to execute the task, as well as, optionally, resources within a particular cloud server allocated to the task. Task launcher 114 may load the virtual machine onto a particular cloud server selected by load balance manager 113 from cloud servers 116. Each cloud server 116 may comprise a hypervisor configured to manage execution of virtual machines thereon.

In some embodiments, the cloud customer UI provided by ecommerce server 111 may comprise a continuous world switch security control. The cloud customer at cloud customer device 100 may interact with the continuous world switch security control to optionally activate and/or deactivate continuous world switch security, thereby producing cloud management data 101 comprising an activation command configured to activate/deactivate continuous world switch security within data center 110.

In response to receiving an activation command, ecommerce server 111 may be configured to arrange data center 110 to allow world switches, and not context switches, for virtual machines executing tasks on behalf of the cloud customer. In some embodiments, all tasks performed on behalf of the cloud customer may be subject to continuous world switch security. In some embodiments, certain select tasks performed on behalf of the cloud customer may be subject to continuous world switch security. For example, the cloud customer may select tasks subject to continuous world switch security using task selection features in the cloud customer UI. Also, in some embodiments data center 110 may be preconfigured to apply continuous world switch security to certain selected tasks, e.g., security-sensitive tasks involving sensitive cloud customer data such as bank information, online passwords, and the like. In some embodiments, all tasks performed on behalf of all cloud customers may be subject to continuous world switch security, in which case continuous world switch security controls need not be provided in a cloud customer UI provided by ecommerce server 111, or continuous world switch security controls may optionally allow customers to opt out of continuous world switch security.

In some embodiments, ecommerce server 111 may be configured to arrange data center 110 to allow world switches, and not context switches, for virtual machines executing tasks on behalf of a cloud customer by placing a world switch indicator in administrative records 115. The world switch indicator may for example comprise any digitally stored information indicating that tasks on behalf of a particular cloud customer are subject to continuous world switch security. Continuous world switch security is therefore on, or activated, for a cloud customer or cloud customer task when a world switch indicator associated with the cloud customer indicates that continuous world switch security is on. Conversely, continuous world switch security is off, or deactivated, for a cloud customer or cloud customer task when a world switch indicator associated with the cloud customer indicates that continuous world switch security is off.

Task launcher 114 may be configured to check a world switch indicator when launching a task on behalf of a cloud customer. When the world switch indicator indicates that continuous world switch security is on, task launcher 114 may be configured to activate a hypervisor setting in a cloud server hypervisor that is assigned to manage a virtual machine launched by task launcher 114 on behalf of the cloud customer. When the hypervisor setting is off or deactivated, task launcher 114 may proceed to configure and load the virtual machine a cloud server, without activating the hypervisor setting. In some embodiments, data center 110 may comprise some cloud servers configured to perform continuous world switching between virtual machines executing thereon, and some different cloud servers configured to perform world switches and context switches, and task launcher 114 may be configured to assign virtual machines subject to continuous world security to the cloud servers configured to perform continuous world switching.

Figure 2:
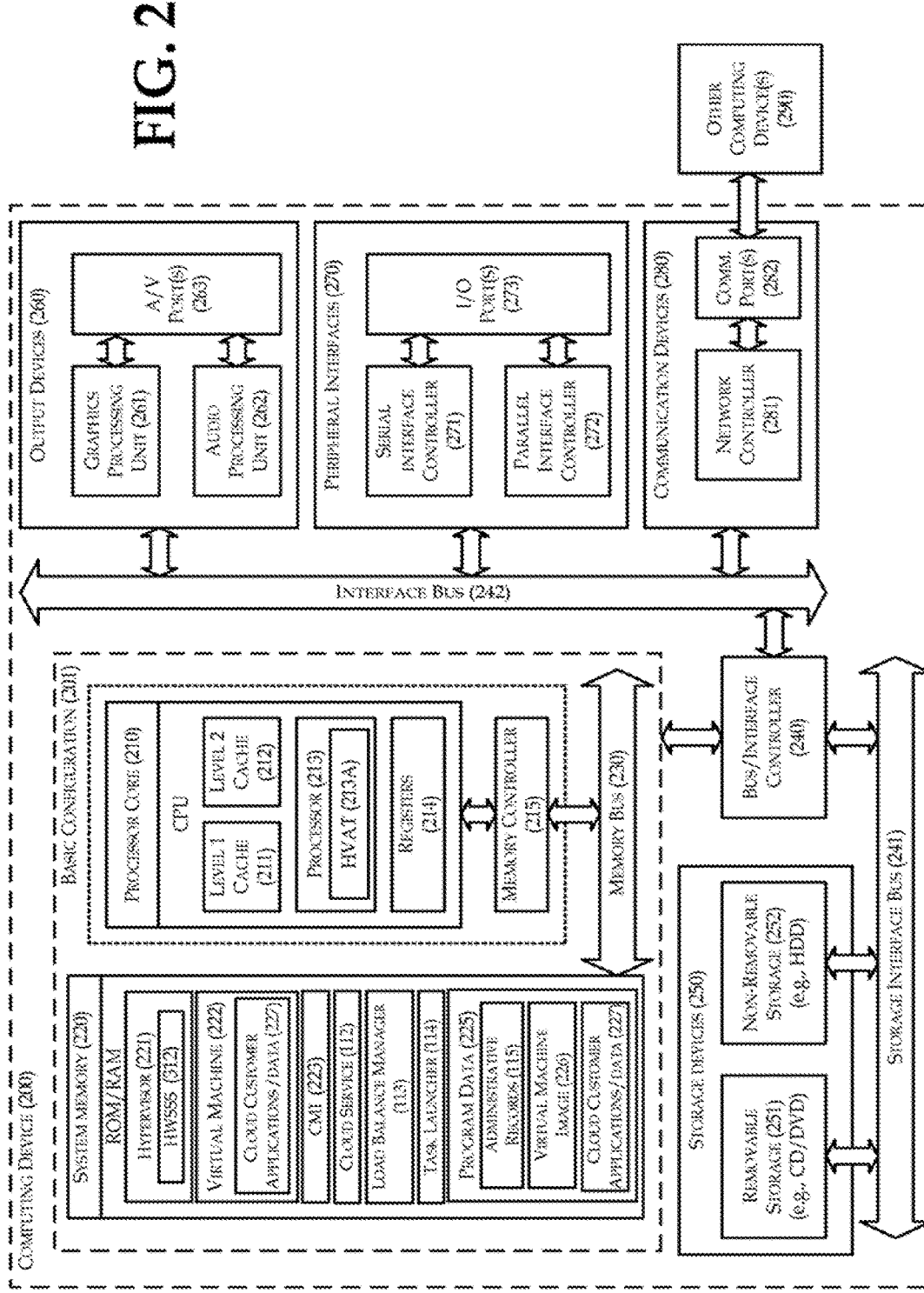
FIG. 2 is a block diagram illustrating a computing device as one example of a cloud server and/or an ecommerce server.

FIG. 2 is a block diagram of a computing device 200 as one example of a cloud server 116 and/or an ecommerce server 111. Computing device 200 is arranged in accordance with at least some embodiments of the present disclosure. In a very basic configuration 201, computing device 200 may include one or more processor cores 210 and system memory 220. A memory bus 230 may be used for communicating between a processor core 210 and a system memory 220.

Depending on the desired configuration, processor core 210 may be of any type and may comprise a Central Processing Unit (CPU). Processor core 210 may include one or more levels of caching, such as a level one cache 211 and a level two cache 212, one or more processors 213, and registers 214. A memory controller 215 may also be used with the processor core 210, or in some implementations the memory controller 215 may be an internal part of the processor core 210.

A processor 213 may for example comprise a processor 213 such as those made by INTEL®, AMD®, or IBM®. These example processor vendors, and various other processor vendors, make numerous processor variants, which are continuously upgraded and improved to include additional features. Any processor now made or as may be developed in the future may be arranged to serve as a processor 213 for the purpose of this disclosure. Some processors 213 may include one or more hardware virtualization assistance tools (HVAT) 213A, which may be optionally employed in some embodiments of this disclosure. HVAT 213A may be within a single core such as processor core 210, or HVAT 213A may be shared among multiple cores in some embodiments. HVAT 213A may be configured, inter alia, to receive and execute virtual machine world switch commands. For example, HVAT 213A within AMD PACIFICA® enterprise processors are referred to as "Rapid Virtualization Indexing" tools, which incorporate a discrete VMRUN command configured to facilitate world switching. The VMRUN command may be received and executed by an AMD processor to swap a current "world" with a buffer (the VMCB or "Virtual Machine Cache Buffer"). In another example, certain INTEL® processors include so-called "VT" technology which includes a variety of capabilities such as secure I/O device direction and privileged instruction trapping, in addition to features configured to receive and execute virtual machine world switch related commands. Certain IBM processors include technologies presently referred to as "Live Partition Mobility (LPM)" which may also be configured to receive and execute virtual machine world switch related commands.

Depending on the desired configuration, the system memory 220 may be of any type including but not limited to volatile memory (such as RAM), non-volatile memory (such as ROM, flash memory, etc.), or any combination thereof. System memory 220 may include a hypervisor 221, a virtual machine 222, a Cloud Management Interface (CMI) 223, cloud service 112, load balance manager 113, task launcher 114, and program data 225. Hypervisor 221 may include a Hypervisor World Switch Security Setting (HWSSS) 312, also referred to herein as a hypervisor setting. Virtual machine 222 may be configured with cloud customer applications and data 227.

Program data 225 may include administrative records 115, one or more virtual machine images 226, and cloud customer applications and data 227. It will be appreciated with the benefit of this disclosure that the features of hypervisor 221, virtual machine 222, CMI 223, cloud service 112, load balance manager 113, task launcher 114, and program data 225 disclosed herein may be rearranged and combined in a large variety of different ways. This disclosure contemplates the possibility of moving any of the disclosed features into any of described software elements, as may be necessary or convenient for particular embodiments.

Figure 3:
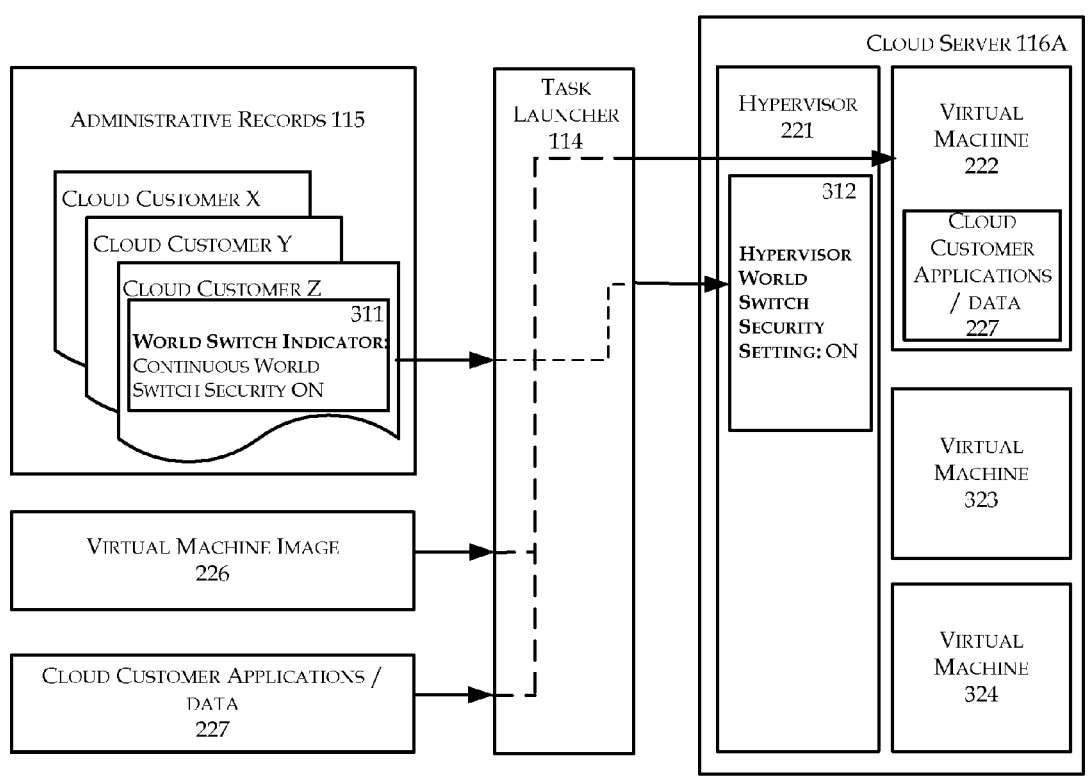
FIG. 3 is a block diagram illustrating example elements of a data center.
Figure 4:
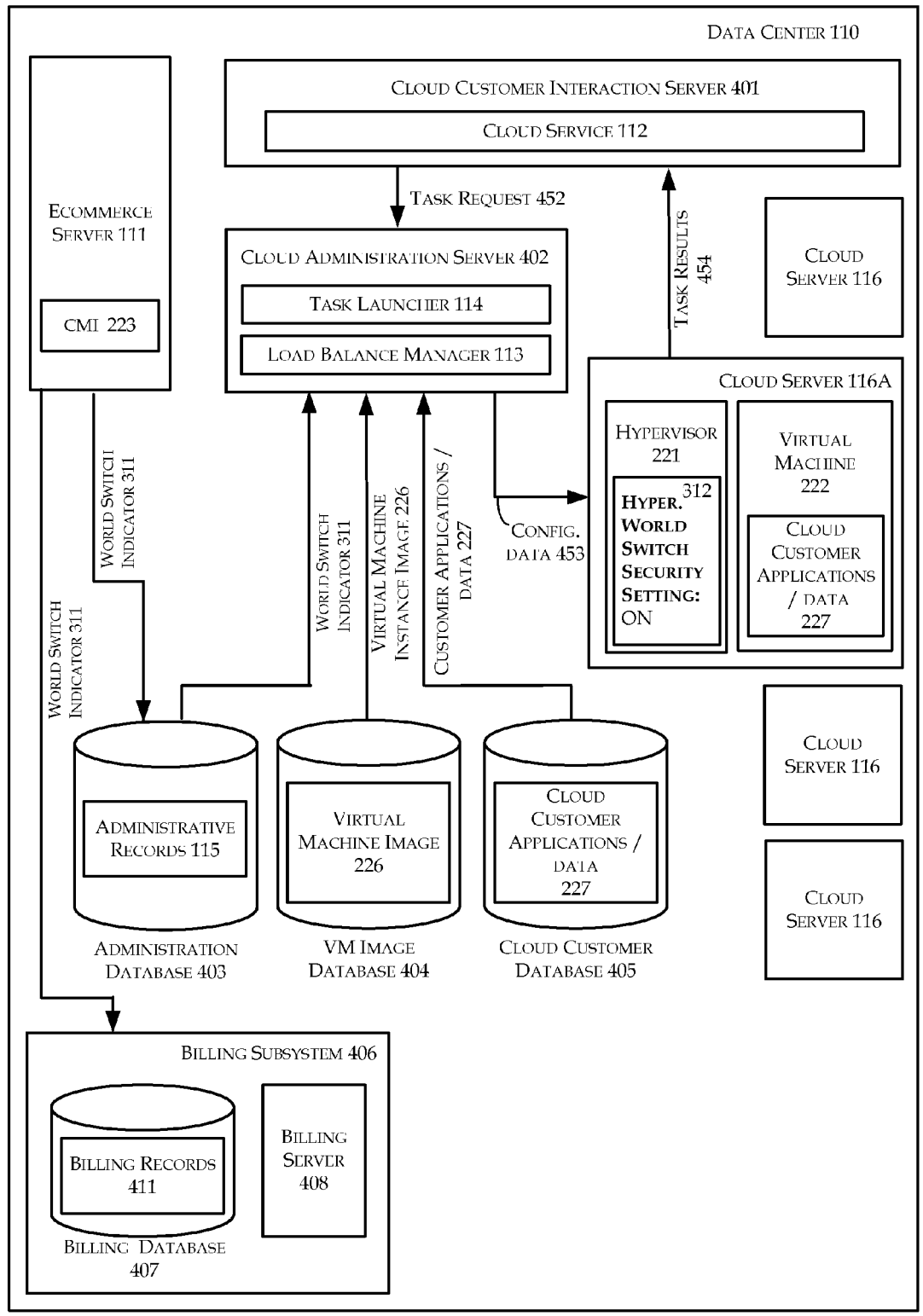
FIG. 4 is a block diagram illustrating example elements of a data center.

System memory 220 includes elements which may be combined into a single computing device 200 as illustrated in FIG. 2, or which may be distributed across several different computing devices, for example as illustrated in FIG. 1, FIG. 3, and/or FIG. 4. For example, in some embodiments, ecommerce server 111 may comprise CMI 223 without the other elements illustrated in system memory 220. A cloud server 116 may comprise hypervisor 221 and virtual machine 222. Any number of additional servers may comprise cloud service 112, load balance manager 113, task launcher 114, and/or program data 225.

Computing device 200 may have additional features or functionality, and additional interfaces to facilitate communications between the basic configuration 201 and any required devices and interfaces. A bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and non-volatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of computing device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display, or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

FIG. 3 is a block diagram illustrating example elements of a data center, arranged in accordance with at least some embodiments of the present disclosure. FIG. 3 comprises administrative records 115, a virtual machine image 226, cloud customer applications/data 227, task launcher 114, and a particular cloud server 116A selected to execute a virtual machine 222 for which continuous world switch security is active. Administrative records 115 comprise records corresponding to a plurality of cloud customers, e.g., cloud customer X, cloud customer Y, and cloud customer Z. A record for cloud customer Z includes a world switch indicator 311 designating that continuous world switch security is ON for cloud customer Z.

Cloud server 116A includes hypervisor 221 and virtual machines 222, 323, and 324. Hypervisor 221 is configured with a hypervisor setting 312, shown with continuous world switch security set to ON for at least virtual machine 222.

FIG. 3 also includes an arrow from world switch indicator 311 within administrative records 115, across task launcher 114, to hypervisor setting 312. FIG. 3 also includes an arrow from virtual machine image 226 and cloud customer applications/data 227, across task launcher 114, to virtual machine 222 and cloud customer applications/data 227 executed within cloud server 116A.

In FIG. 3, administrative records 115 may comprise, inter alia, world switch indicator 311 designating continuous world switching security is active for a cloud customer. In some embodiments, world switch indicator 311 may be stored along with other administrative records, for example in an administration database. In some embodiments, world switch indicator 311 may be stored along with virtual machine image 226 and/or cloud customer applications/data 227, for example in a virtual machine image database and/or a cloud customer database. World switch indicator 311 may optionally include conditions, such as bits to indicate "only when on hardware shared with other cloud customers", as discussed further herein. Task launcher 114 may be configured to handle world switch indicator 311 and associated conditions when loading virtual machine 222 to execute one or more tasks on behalf of a cloud customer pursuant to cloud customer interactions with a cloud service.

Task launcher 114 may be configured to activate hypervisor setting 312 in hypervisor 221 in response to detecting that world switch indicator 311 indicates continuous world switch security is on for a cloud customer. World switch indicator 311 may be relayed by task launcher 114 to hypervisor 221. Hypervisor 221 may be configured with continuous world switch security capability, for example by including a hypervisor setting 312 which may be activated/deactivated, also referred to herein as turning the hypervisor setting "on" and "off". When multiple virtual machines, e.g., 222, 323, and 324 are running at cloud server 116A and appropriate conditions are true, hypervisor 221 may be configured to activate world switching, with no context switching, on any virtual machine that is so indicated, e.g., virtual machine 222.

Hypervisor 221 may be executable by one or more processor cores of cloud server 116A, and may be configured to manage execution of virtual machines 222, 323, 324 by cloud server 116A. Hypervisor 221 may be capable of context switches and world switches between virtual machines 222, 323, 324 executable by cloud server 116A. For example, hypervisor 221 may be configured to initiate context switches and world switches between virtual machines 222, 323, 324 executable by cloud server 116A. Hypervisor 221 may be configured to implement hypervisor setting 312. Hypervisor setting 312 may be associated with a task, e.g., a task that is executed as part of cloud customer applications/data 227. When hypervisor setting 312 is on, hypervisor 221 may be configured to allow only world switches, and not context switches, between virtual machine 222 including the task and other virtual machines 323, 324 executable by cloud server 116A. When hypervisor setting 312 is off, hypervisor 221 may be configured to allow both world switches and context switches between virtual machine 222 including the task and other virtual machines 323, 324 executable by cloud server 116A.

Each processor core of a cloud server has a processor state defined at least in part by a state of cache memory 211 and/or 212. Context switches between virtual machines 222, 323, 324 allow at least a portion of the processor state associated with a first virtual machine to remain during execution of a next or subsequent virtual machine. World switches between the virtual machines 222, 323, 324 eliminate much or all of the processor state associated with the first virtual machine when switching to execution of the next or subsequent virtual machine. The terms "next" virtual machine and "subsequent" virtual machine are used interchangeably herein. For example, world switches may eliminate at least a cache, register, or pipeline state associated with the first virtual machine when switching to execution of the next virtual machine. For this reason, world switches offer greater security to cloud customer applications/data 227 within a first virtual machine.

In some embodiments, hypervisor 221 may be configured to initiate world switches between virtual machines 222, 323, 324 using a HVAT which may be provided by one or more processor cores of cloud server 116A. Typically, a HVAT will significantly increase the speed of world switches. Cloud servers having a HVAT may be preferred, e.g., by load balance manager 113, for allocation of virtual machines for which continuous world switch security is on. World switching is also possible on cloud servers not having a HVAT, and therefore cloud servers not having a HVAT may also accommodate virtual machines for which continuous world switch security is on in some embodiments.

In some embodiments, hypervisor 221 may be configured to implement hypervisor setting 312 by including a trap handler configured to check hypervisor setting 312. Hypervisor setting 312 may comprise a variable in a memory location accessible to hypervisor 221. For example, during execution of a first virtual machine, hypervisor 221 may be configured to detect a next virtual machine processor command from a next virtual machine, and to refer to hypervisor setting 312 for one or more of the first virtual machine and the next virtual machine, and to trap the next virtual machine processor command when hypervisor setting 312 is on for one or more of the first virtual machine and the next virtual machine. In some embodiments, hypervisor 221 may be configured to trap a next virtual machine processor command when hypervisor setting 312 is on for a first virtual machine, regardless of whether hypervisor setting 312 is on for a next virtual machine.

In some embodiments, hypervisor 221 may additionally be configured to detect a trap-list processor command by referring to a trap list, and to trap a trap-list processor command from a virtual machine, thereby initiating a world switch. For example, in a variety of presently available hypervisor implementations, world switching is triggered when processes make processor calls that affect "protected" or "restricted" state. However, there is not a clear definition of such instructions affecting "protected" or "restricted" state in the x86 instruction set architecture, because there are a few exceptions in each class. Thus a hypervisor may maintain a list of instructions to "trap" which cause the hypervisor to world switch instead of context switch.

In some embodiments, hypervisor 221 may be configured with an "OR" function where a command from a given virtual machine is trapped for world switching if the command is on the trap list OR if hypervisor setting 312 is on for the virtual machine, e.g., virtual machine 222. An example hypervisor 221 configured to operate in accordance with this disclosure may therefore include an OR function as well as a variable for each virtual machine 222, 323, 324, wherein the variable is configured to hold a hypervisor setting such as hypervisor setting 312.

In some embodiments, task launcher 114 may be configured to check at least one condition, in addition to world switch indicator 311, prior to activating hypervisor setting 312 in hypervisor 221. Task launcher 114 may be configured to activate hypervisor setting 312 in hypervisor 221 when the condition is satisfied. For example, the condition may comprise a multiple cloud customer condition, wherein virtual machines such as virtual machines 222, 323, 324 presently executable by a cloud server such as cloud server 116A are associated with more than one cloud customer. Task launcher 114 may be configured with test logic configured to check at least one condition. In some embodiments, the test logic may be provided in hypervisor 221 instead of or in addition to test logic in task launcher 114.

For example, in some embodiments, when a virtual machine instance is moved, or when a virtual machine image is used to create a new virtual machine on a given cloud server, test logic can check to see if the moved/new virtual machine changes conditions specified in administrative records 115 associated with world switch indicators. The test logic may for example be configured to check if the moved/new virtual machine is a first virtual machine associated with a different cloud customer on a shared cloud server. The test logic may be configured to check administrative records 115 for each virtual machine on a cloud server, and task launcher 114 may be configured to alter a hypervisor setting within a hypervisor in the cloud server when any of the virtual machines have world switch indicators that include conditions triggered by a change of state.

In some embodiments, task launcher 114 may be configured to load virtual machine 222 and to optionally set hypervisor setting 312 in a cloud server, e.g., in cloud server 116A, that is selected by load balance manager 113. Load balance manager 113 is illustrated for example in FIG. 1. Load balance manager 113 may be configured to accommodate continuous world switch security for example by checking world switch indicator 311 prior to assigning virtual machine 222 to a particular cloud server. Load balance manager 113 may be configured to allocate additional processing resources including one or more of processing time, processor cores, cloud servers, and memory resources to virtual machines including tasks for which continuous world switch security is on, such as virtual machine 222. Thus, when a cloud customer for example pays to achieve enhanced, continuous world switch security, such cloud customer does not receive degraded cloud service response times.

In some embodiments, load balance manager 113 may be configured to group virtual machines including tasks for which continuous world switch security is on, into one or more same cloud servers. Grouping virtual machines subject to continuous world switch security may provide efficiencies at least in part because additional processing resources associated with world switches may be beneficially applied simultaneously to two or more virtual machines.

In some embodiments, to accommodate potentially degraded cloud service response speeds for cloud customers sharing a cloud server 116A in which continuous world switch security is on, a security certification may be offered, e.g., via ecommerce server 111, in which a cloud customer earns a discount for a particular virtual machine by volunteering the cloud customer virtual machine to be continuously world switched without additional processing resources. This may be acceptable, for example, for cloud customer virtual machines including processes that require minimal processing or which are not time-critical. Offering the security certification may increase a population of security certified processes that load balance manager 113 can rearrange for resource optimization. Load balance manager 113 may be configured to pair a virtual machine for which continuous world switch security is "on", such as virtual machine 222, on a same cloud server 116A as virtual machines, such as, e.g., virtual machine 324, for which continuous world switch security is accepted along with potentially degraded cloud service performance.

In some embodiments, load balance manager 113 may be configured to allocate tasks for which continuous world switch security is on to cloud servers comprising a HVAT in one or more processor cores thereof.

In some embodiments, an enhanced security nature of a virtual machine loaded on behalf of a cloud customer may be relayed to billing records, e.g., to a billing subsystem as discussed further herein. For example, task launcher 114 may be configured to communicate continuous world switch security information to a billing subsystem. Other components illustrated in FIG. 3 may also be configured to interact with a billing subsystem. In some embodiments, continuous world switch security may be part of a consolidated security level offering.

In some embodiments, when a virtual machine, e.g., virtual machine 323 receives continuous world switch security as a voluntary option to receive an enhanced security certification, additional resources may optionally not be allocated to virtual machine 323. When virtual machine 323 receives continuous world switch security as a voluntary option to receive an enhanced security certification, a cloud customer associated with virtual machine 323 may optionally receive a "safety discount" applied to billing.

In some embodiments, task launcher 114 may be configured to select a virtual machine image from a plurality of differently configured virtual machine images. The plurality of differently configured virtual machine images may comprise, e.g., a variety of different operating system types and versions. Task launcher 114 may be configured to select an appropriate virtual machine image to pair with a particular cloud customer's applications/data. In some embodiments, a virtual machine image may be provided by a cloud customer, and the provided virtual machine image may optionally be retrieved from a same database as cloud customer applications/data 227 and/or administrative records 115.

In some embodiments, task launcher 114 may be configured to select cloud customer applications/data from a database comprising applications and data associated with a plurality of cloud customers. Task launcher 114 may be configured to select cloud customer applications/data corresponding to a particular task, and to configure virtual machine using a selected virtual machine image and selected cloud customer applications/data. For example, task launcher 114 may configure virtual machine 222 by combining virtual machine image 226 and cloud customer applications/data 227 in order to execute a particular task, and task launcher 114 may load and execute virtual machine 222 on a selected cloud server such as cloud server 116A.

FIG. 4 is a block diagram illustrating example elements of a data center, arranged in accordance with at least some embodiments of the present disclosure. Data center 110 comprises ecommerce server 111, a cloud customer interaction server 401, a cloud administration server 402, a plurality of cloud servers 116, an administration database 403, a virtual machine image database 404, a cloud customer database 405, and a billing subsystem 406. Ecommerce server 111 comprises a CMI 223. Cloud customer interaction server 401 comprises cloud service 112. Cloud administration server 402 comprises load balance manager 113 and task launcher 114. A selected cloud server 116A comprises hypervisor 221 and virtual machine 222. Hypervisor 221 comprises hypervisor setting 312. Virtual machine 222 is configured with cloud customer applications/data 227. Administration database 403 comprises administrative records 115. Virtual machine image database 404 comprises a virtual machine image 226. Cloud customer database 405 comprises cloud customer applications/data 227. Billing subsystem 406 comprises a billing database 407 and a billing server 408. Billing database 407 comprises billing records 411.

In FIG. 4, it is contemplated that cloud management data 101 and cloud service interaction data 102 are exchanged between data center 110 and cloud customer devices such as cloud customer device 100, as illustrated in FIG. 1. Cloud management data 101 may be directed to ecommerce server 111, while cloud service interaction data 102 may be directed to cloud customer interaction server 401.

In FIG. 4, in response to receiving a cloud customer activation command to activate continuous world switch security, ecommerce server 111 may be configured to provide world switch indicator 311 to billing subsystem 406 and administration database 403. Billing subsystem 406 may be configured to update billing database 407 and bill a cloud customer for enhanced security using billing server 408. Administration database 403 may be configured to update administrative records 115 to include world switch indicator 311 associated with the cloud customer providing the activation command. Administration database 403 may be configured to store world switch indicator 311 for example within a digital certificate associated with the cloud customer. In some embodiments, world switch indicator 311 may be stored in virtual machine image database 404 and/or cloud customer database 405, and the ecommerce server 111 may be configured to provide world switch indicator 311 to databases 403, 404, and/or 405 as appropriate.

Cloud customer interaction server 401 may be configured to receive cloud customer cloud service requests, e.g., as part of cloud service interaction data 102. Cloud service 112 may generate one or more task requests such as task request 452 in response to received cloud service requests. Task request 452 may be initially provided to cloud administration server 402. Cloud administration server 402 may be configured to check administrative records 115 for the presence of world switch indicator 311, to retrieve an appropriate virtual machine image from virtual machine image database 404 to handle a task, and to retrieve appropriate cloud customer applications/data from cloud customer database 405 to handle the task.

Load balance manager 113 may be configured to select a cloud server to execute a virtual machine including cloud customer applications/data. For example, load balance manager 113 may select cloud server 116A to execute virtual machine 222 including virtual machine image 226 and cloud customer applications/data 227. Load balance manager 113 may account for world switch indicator 311 in selecting an appropriate cloud server. Task launcher 114 may be configured to provide configuration data 453 to selected cloud server 116A. Configuration data 453 may comprise instructions/data configured to activate hypervisor setting 312 in hypervisor 221 of selected cloud server 116A, and instructions/data configured to load and execute virtual machine image 226 and cloud customer applications/data 227. Virtual machine image 226 and cloud customer applications/data 227 may be loaded in selected cloud server 116A as virtual machine 222 with cloud customer applications/data 227.

Selected cloud server 116A executing virtual machine 222 may be configured to forward task results 454 to cloud customer interaction server 401 as task results 454 are generated. Cloud service 112 may be configured to provide task results 454 to a cloud customer, as part of cloud service interaction data 102. After task launcher 114 has loaded virtual machine 222, cloud service 112 may be configured to provide subsequent cloud service interaction data 102 directly to selected cloud server 116A.

In some embodiments, ecommerce server 111 may be configured to interact with a cloud customer via CMI 223. CMI 223 may be loadable in a memory of ecommerce server 111 and executable by a processor thereof, as discussed with reference to FIG. 2. CMI 223 may be configured to provide a cloud customer UI to cloud customers via a communication device in ecommerce server 111.

FIG. 5 is a diagram illustrating elements of an example cloud customer UI, arranged in accordance with at least some embodiments of the present disclosure. A cloud customer UI 500 may for example comprise one or more continuous world switch security controls 501, 502, and/or 503, wherein continuous world switch security controls 501, 502, and/or 503 may be configured to receive activation commands to activate continuous world switch security associated with one or more tasks to be performed, on behalf of the cloud customer, by the one or more cloud servers 116 of a data center 110. In embodiments according to FIG. 5, cloud customer UI 500 may be configured to receive an activation command for example when a cloud customer selects "on" in one or more of the continuous world switch security controls 501, 502, and/or 503. In response to receiving an activation command via one or more of the continuous world switch security controls 501, 502, and/or 503 in the cloud customer UI 500, CMI 223 may be configured to arrange one or more servers of a data center to allow world switches, and not context switches, between a virtual machine executing tasks on behalf of the cloud customer, and other virtual machines executable by one or more cloud servers of the data center.

In some embodiments, a continuous world switch security activation command received at CMI 223 may be associated with a cloud customer and all tasks to be performed by cloud servers on behalf of the cloud customer. For example, the cloud customer may request a heightened security level for all tasks performed in the data center 110 using continuous world switch security control 501. In other embodiments, certain specific tasks or task types may be specified as those subject to continuous world switch security, e.g., using continuous world switch security controls 502 and/or 503. In some embodiments, task types subject to continuous world switch security may be identified by task metadata such as metadata identifying a task as having elevated security, or being related to health care, financial records, or other sensitive information. A world switch indicator generated by ecommerce server 111 in response to receiving activation commands via controls 502 and/or 503 may identify specific tasks and/or task types in administrative records 115 associated with the world switch indicator.

In some embodiments, ecommerce server 111 may be configured to provide, e.g., in a cloud customer UI generated by CMI 223, price information 510 relating to activating continuous world switch security. In some embodiments, price information 510 may be variable depending, for example, upon cloud customer service volume, and so price information 510 may be dynamically generated and populated in a cloud customer UI 500 by CMI 223. For example, a large corporation or government agency cloud customer may use significantly more cloud service volume than an individual or small business. As a result, additional processing required to implement continuous world switch security may be significantly more for the large cloud customer, and such considerations may be accounted for in dynamically generating price information 510.

In some embodiments, ecommerce server 111 may be configured to provide, in cloud customer UI 500, a cloud customer control 504 configured to allow tasks associated with a cloud customer to execute on a cloud server that also executes tasks having an activated hypervisor setting. For example, as described herein, a cloud customer may be offered a discount (in this example, a $25 discount) in return for designating that one or more cloud customer tasks, and/or all cloud customer tasks may be co-located with virtual machines subject to continuous world switch security. Cloud customer preference information received via cloud customer control 504 may in some embodiments be reflected in a secondary world switch indicator placed in administrative records 115, wherein the secondary world switch indicator is different from world switch indicator 311 in that the secondary world switch indicator does not necessarily require full continuous world switch security.

In some embodiments, ecommerce server 111 may be configured to provide a security certification to a cloud customer that activates continuous world switch security. For example, a certificate may be sent by ecommerce server 111 to a cloud customer email address, or may be made available for download via a link 551 provided in a cloud customer UI 550 generated by CMI 223. A provided security certificate may be encrypted using a private key and accessible using a publicly distributed public key. A provided security certificate may certify that cloud customer tasks are performed under an enhanced security tier, e.g., a security tier comprising continuous world switch security. Such a certificate may be useful for example, in the context of cloud customers who may handle sensitive data on behalf of others, by allowing a cloud customer to prove security of cloud customer applications and data used within data center 110. Such a certificate may also be embedded in customer instances or data within data center 110 to indicate customer selection of continuous world switch security.

In some embodiments, arranging one or more cloud servers 116, by an ecommerce server 111, to allow world switches, and not context switches, may comprise generating an administrative record in administrative records 115 associated with a cloud customer, the administrative record including world switch indicator 311. A generated administrative record may comprise, for example, a digital certificate. In some embodiments, the digital certificate placed in administrative records 115 may be a same digital certificate as provided to a cloud customer for example via link 551, however there is no requirement that the certificates be the same. A digital certificate for storage in administrative records 115 is for the use of data center 110, and may include any other data usefully associated with a cloud customer and/or specific cloud customer tasks to be performed by data center 110. In some embodiments, ecommerce server 111 may for example be configured to provide world switch indicator 311 to each cloud server 116 individually instead of or in addition to storing world switch indicator 311 in administrative records 115.

In some embodiments, arranging one or more cloud servers 116, by an ecommerce server 111, to allow world switches, and not context switches, between a virtual machine with activated continuous world switch security, and other virtual machines executable by a cloud server may comprise for example providing conditions with world switch indicator 311. An example condition may comprise a "multi-user" or "shared-hardware" condition as discussed herein. By specifying in administrative records 115 that continuous world switch security applies when a cloud server is shared among multiple cloud customers, and not otherwise, ecommerce server 111 may thereby configure cloud servers 116 to allow world switches and not context switches by an individual selected cloud server 116A, when virtual machines 222, 323, 324 are associated with multiple cloud customers. Ecommerce server 111 may also thereby configure an individual selected cloud server 116A to allow world switches and context switches when virtual machines 222, 323, 324 are associated with a single cloud customer or single class of cloud customer, e.g., cloud customers that are affiliated with one another and/or cloud customers meeting predetermined cloud customer trust criteria such as through possession of a third party certification.

Returning now to FIG. 4, data center 110 is illustrated comprising one or more interconnected servers 111, 401, 402, 116 configured to provide cloud services 112. Example data center 110 comprises, inter alia, digital administrative records 115 comprising world switch indicators (see FIG. 3) associated with one or more cloud customers, and task launcher 114 configured to check for a world switch indicator when launching a task on behalf of a cloud customer. Launching the task comprises loading a virtual machine such as virtual machine 222 comprising cloud customer applications/data 227 configured to perform the task. Data center 110 may also be configured to activate, in response to an indication by a world switch indicator that continuous world switch security is on, a hypervisor setting for a virtual machine managed by a hypervisor of one or more of the cloud servers 116. For example, data center 110, may activate hypervisor setting 312 for virtual machine 222 managed by hypervisor 221 in cloud server 116A, in response to an indication by a world switch indicator, such as world switch indicator 311, that continuous world switch security is on for a cloud customer associated with the virtual machine 222.

It will be appreciated that cloud servers 116 may comprise one or more hypervisors configured to initiate context switches and world switches between virtual machines executable by the cloud servers 116. Hypervisors may implement hypervisor settings, so that when a hypervisor setting is on, a hypervisor is configured to allow world switches, and not context switches, between a virtual machine including a task and other virtual machines executable by the one or more processor cores of a corresponding cloud server. Conversely, when a hypervisor setting is off, a hypervisor may be configured to allow world switches and context switches between the virtual machines including the task and other virtual machines executable by the one or more processor cores of a corresponding cloud server. For example, when hypervisor setting 312 is on, hypervisor 221 may be configured to allow world switches, and not context switches, between virtual machine 222 including a task executable by cloud customer applications/data 227, and other virtual machines 323, 324 executable by cloud server 116A. Conversely, when hypervisor setting 312 is off, hypervisor 221 may be configured to allow world switches and context switches between virtual machine 222 and virtual machines 323, 324.

In some embodiments, data center 110 may be configured to communicate continuous world switch security information to billing subsystem 406. For example, ecommerce server 111, task launcher 114, or another component of FIG. 4 as appropriate for a particular configuration, may communicate with billing subsystem 406.

In some embodiments, task launcher 114 may be configured to check at least one condition, in addition to world switch indicator 311, prior to activating a hypervisor setting in a hypervisor, and task launcher 114 may be configured to activate the hypervisor setting in the hypervisor when the condition is satisfied. The condition may comprise a multiple cloud customer condition, as described herein, wherein continuous world switch security is activated when virtual machines presently executable by a server are associated with more than one cloud customer. For example, prior to activating hypervisor setting 312 in hypervisor 221, task launcher 114 may be configured to check whether virtual machines 222, 323, 324 presently executable by cloud server 116A are associated with more than one cloud customer. Task launcher 114 may be configured to activate hypervisor setting 312 in hypervisor 221 when the condition is satisfied, that is, when virtual machines 222, 323, 324 are associated with more than one cloud customer. Other conditions may comprise, for example, a security classification condition, wherein continuous world switch security is activated when virtual machines presently executable by a server are associated with tasks and/or customer data presenting a predetermined level of security risk. Also, in some embodiments, multiple conditions may be considered together, such as the multiple cloud customer condition and the security classification condition.

Figure 6:
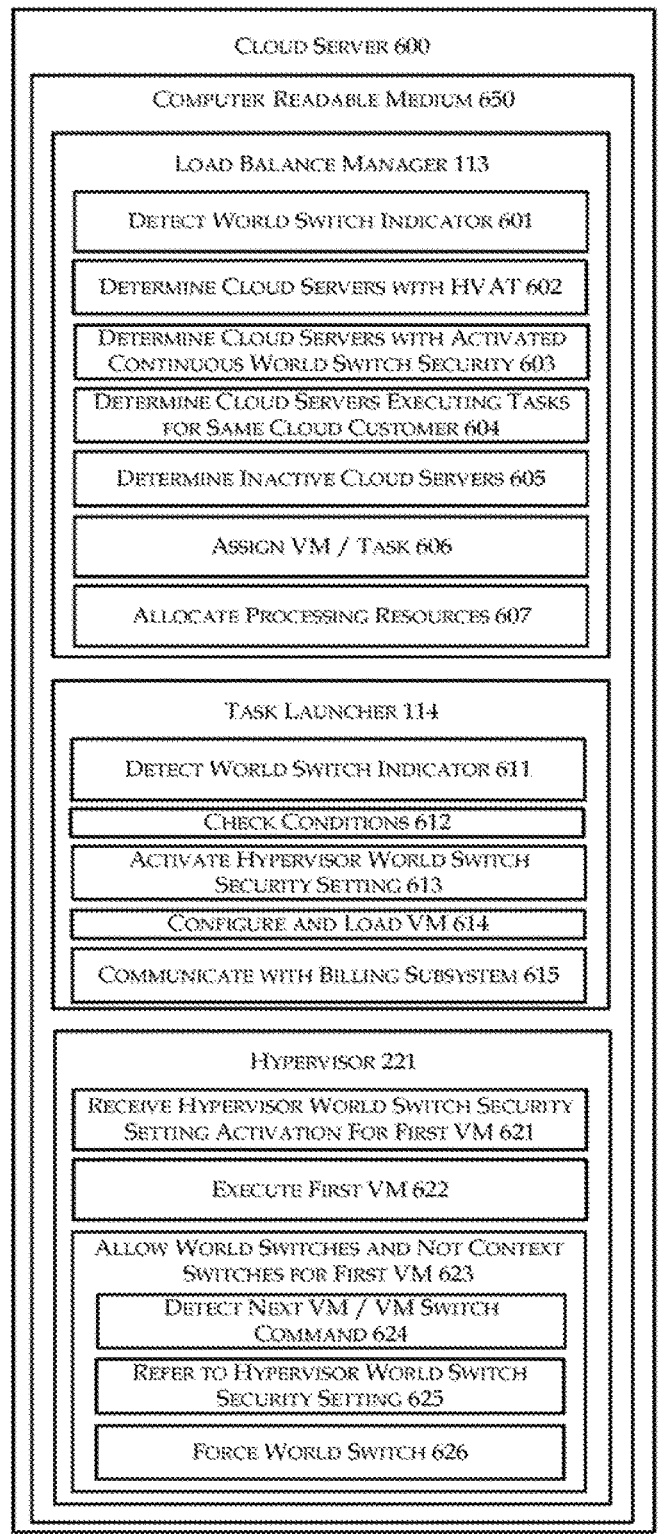
FIG. 6 is a block diagram illustrating an example cloud server.

FIG. 6 is a block diagram illustrating an example cloud server, computer readable medium, and corresponding methods and modules, arranged in accordance with at least some embodiments of the present disclosure. Example cloud server 600 may for example provide a cloud server of cloud servers 116 and/or 116A discussed herein. Example cloud server 600 may include one or more operations/modules including blocks 113, 114, and 221, each comprising a plurality of sub-blocks. The illustrated blocks and sub-blocks represent operations as may be performed in a method, functional modules in a cloud server 600, and/or instructions as may be recorded on a computer readable medium 650. Example methods according to FIG. 6 may be performed by cloud server 600 comprising hypervisor 221 configured to manage execution of virtual machines 222, 323, 324, wherein hypervisor 221 is configured to initiate context switches between virtual machines 222, 323, 324 executable by one or more processor cores of cloud server 600, and wherein hypervisor 221 is configured to initiate world switches between virtual machines 222, 323, 324 executable by the one or more processor cores.

In FIG. 6, the blocks 113, 114, and 221 are illustrated as being performed sequentially, with block 113 first and block 221 last. It will be appreciated that the blocks as well as sub-blocks therein may be re-ordered as convenient to suit particular embodiments, and that these blocks or portions thereof may be performed concurrently in some embodiments. It will also be appreciated that in some examples various blocks may be eliminated, divided into additional blocks, located in separate servers, and/or combined with other blocks.

The illustrated load balance manager block 113 may be arranged to provide functional operations comprising "Detect World Switch Indicator" at block 601, "Determine Cloud Servers with HVAT" at block 602, "Determine Cloud Servers with Activated Continuous World Switch Security" at block 603, "Determine Cloud Servers Executing Tasks for Same Cloud Customer" at block 604, "Determine Inactive Cloud Servers" at block 605, "Assign VM/Task" at block 606, and "Allocate Processing Resources" at block 607.

In load balance manager block 113, load balance manager 113 may be configured to manage operations of blocks 601-607, to balance processing loads among one or more cloud servers of a data center, as well as to balance processing resources within individual cloud servers. In general, load balance manager 113 may be configured to accommodate a continuous world switch security for example by allocating additional processing resources to virtual machines for which continuous world switch security is activated, allocating virtual machines for which continuous world switch security is activated to one or more cloud servers having processors 213 equipped with HVAT 213A, and/or seeking efficiency gains by grouping virtual machines for which continuous world switch security is activated.

In "Detect World Switch Indicator" block 601, load balance manager 113 may be configured to detect a world switch indicator associated with a task. Load balance manager 113 may for example lookup world switch indicator 311 in administrative records 115. Block 601 may be followed by block 602.

In "Determine Cloud Servers with HVAT" block 602, load balance manager 113 may be configured to determine a set of one or more cloud servers in data center 110 that comprise an HVAT 213A in one or more processor cores. Data gathered by block 602 may be used in load balancing as discussed in connection with blocks 606 and 607. Cloud servers comprising an HVAT 213A may be preferred for allocation of virtual machines with activated continuous world switch security. In some embodiments block 602 may be configured to reference a list of cloud servers comprising an HVAT 213A. In some embodiments block 602 may be configured to look up processor types included in one or more cloud servers, and to reference a table including processor types and corresponding HVAT 213A features. In some embodiments block 602 may be unnecessary, e.g., when all cloud servers in data center 110 comprise an HVAT 213A, or when no cloud servers in data center 110 comprise an HVAT 213A. Block 602 may be followed by block 603.

In "Determine Cloud Servers with Activated Continuous World Switch Security" block 603, load balance manager 113 may be configured to determine a set of one or more cloud servers with activated continuous world switch security. For example, in some embodiments, task launcher 114 may maintain a list of cloud servers in which a hypervisor setting 312 is activated. Such a list may be referenced in block 603. Data gathered by block 603 may be used in load balancing as discussed in connection with block 606 and 607. Block 603 may be followed by block 604.

In "Determine Cloud Servers Executing Tasks for Same Cloud Customer" block 604, load balance manager 113 may be configured to identify any cloud servers in data center 110 that are currently executing a virtual machine for a same cloud customer as a new virtual machine/task be assigned to a cloud server. The overhead of continuous world switch security may be avoided in some embodiments when all virtual machines executing on a same cloud server are associated with a same cloud customer. Data gathered by block 604 may be used in load balancing as discussed in connection with block 606 and 607. Block 604 may be followed by block 605.

In "Determine Inactive Cloud Servers" block 605, load balance manager 113 may be configured to determine a set of one or more cloud servers which are not currently in use within data center 110 and are therefore available for assigning tasks. Data gathered by block 605 may be used in load balancing as discussed in connection with block 606 and 607. Block 605 may be followed by block 606.

In "Assign VM/Task" block 606, load balance manager 113 may be configured to assign a virtual machine comprising cloud customer applications/data configured to execute a task to one or more cloud servers of a data center. Block 606 may account for data gathered in blocks 601-605, e.g., by applying a load balancing decision algorithm to calculate a best cloud server for a particular task. Additional data from other sources may also be considered, e.g., data the data gathered in blocks 601-605 may be considered along with load balancing data conventionally used for load balancing in a data center. A load balancing decision algorithm may account for whether a task is subject to continuous world switch security. Data gathered in blocks 601-605 may be weighted to reflect its relative importance in an assignment decision.

In some embodiments, block 606 may comprise allocating additional processing resources including one or more of processing time, processor cores, and memory resources, to a virtual machine including tasks for which continuous world switch security is on. For example, preference may be given to inactive cloud servers and/or cloud servers with "lighter" loads. Also, a hypervisor may be instructed to allocate additional processing resources to a virtual machine including tasks for which continuous world switch security is on.

In some embodiments, block 606 may comprise grouping tasks for which continuous world switch security is on. For example, data gathered in block 603 may be used to prefer cloud servers already executing virtual machines with an activated hypervisor setting when assigning a new virtual machine, wherein the new virtual machine is also subject to continuous world switch security, to a cloud server. Block 606 may be followed by block 607.

In "Allocate Processing Resources" block 607, load balance manager 113 may be configured to allocate additional processing resources including one or more of processing time, processor cores, and memory resources, to a virtual machine including tasks for which continuous world switch security is on. For example, a baseline level of processing resources may apply to virtual machines for which continuous world switch security is off. Block 607 may be configured to provide a virtual machine including tasks for which continuous world switch security is on with an additional amount of processing resources. The additional amount of processing resources may be calculated as a percentage of a baseline, or for example as a fixed additional amount.

In some embodiments, load balance manager block 113 may be implemented at a device in data center 110 other than one of cloud servers 116, e.g., at a cloud administration server 402, as illustrated in FIG. 4.

The illustrated task launcher block 114 may be arranged to provide functional operations comprising "Detect World Switch Indicator" at block 611, "Check Conditions" at block 612, "Activate Hypervisor World Switch Security setting" at block 613, "Configure and Load VM" at block 614, and "Communicate with Billing Subsystem" at block 615.

In task launcher block 114, task launcher 114 may be configured to manage operations of blocks 611-615, to configure and load virtual machines in cloud servers 116 of data center 110, wherein a configured virtual machine serves to carry out one or more cloud customer tasks. In general, task launcher 114 may be configured to accommodate continuous world switch security for example by checking a world switch indicator, and if the world switch indicator requires, activating a hypervisor setting in a hypervisor where the virtual machine is to be executed.

In "Detect World Switch Indicator" block 611, task launcher 114 may be configured to detect a world switch indicator associated with a task. Block 611 may be identical to block 601 in some embodiments, and blocks 601 and 611 may be combined in some embodiments. In some embodiments, blocks 601 and/or 611 may be configured to detect a cloud customer associated with a task, and to reference a world switch indicator associated with an identified cloud customer. Also, in embodiments in which cloud customers specify task types that are subject to continuous world switch security, blocks 601/611 may be configured to reference specified task types. Block 611 may be followed by block 612.

In "Check Conditions" block 612, task launcher 114 may be configured to check at least one condition, in addition to a world switch indicator, prior to activating a hypervisor setting in a hypervisor, and to activate a hypervisor setting in the hypervisor when the condition is satisfied. For example, administrative records 115 associated with a world switch indicator may comprise one or more conditions defining when to apply continuous world switch security for a task, and/or when not to apply continuous world switch security for a task. Task launcher 114 may be configured to check conditions, determine whether any conditions are or are not met, and apply a hypervisor setting accordingly. In some embodiments, a condition may for example comprise a multiple cloud customer condition, wherein virtual machines presently executable by a cloud server are associated with more than one cloud customer. When such virtual machines are associated with more than one cloud customer, a hypervisor setting may be activated. When such virtual machines are not associated with more than one cloud customer, a hypervisor setting may optionally not be activated. Block 612 may be followed by block 613.

In "Activate Hypervisor World Switch Security setting" block 613, task launcher 114 may be configured to activate a hypervisor setting in a hypervisor in response to detecting that a world switch indicator requires world switches, and not context switches, between a virtual machine including a task and other virtual machines executable by a cloud server comprising the hypervisor. Block 613 may be configured for example to set a variable in a specified memory location that is reserved for a hypervisor setting to be used by a hypervisor. Block 613 may also identify a virtual machine associated with a hypervisor setting, so a hypervisor may apply continuous world switch security to only those virtual machines having an activated hypervisor setting. Block 613 may be followed by block 614.

In "Communicate with Billing Subsystem" block 615, task launcher 114 may be configured to communicate continuous world switch security information to billing subsystem 406. Continuous world switch security information may comprise, for example, a time and duration of execution of a virtual machine subject to continuous world switch security, as well as a cloud customer associated with the virtual machine subject to continuous world switch security.

In some embodiments, task launcher block 114 may be implemented at a device in data center 110 other than one or more of cloud servers 116, e.g., task launcher block 114 may be implemented at cloud administration server 402, as illustrated in FIG. 4.

Hypervisor block 221 may be arranged to provide functional operations comprising "Receive Hypervisor World Switch Security setting Activation For First VM" at block 621, "Execute First VM" at block 622, and "Allow World Switches and Not Context Switches for First VM" at block 623. Block 623 may comprise "Detect Next VM/VM Switch Command" at block 624, "Refer to Hypervisor World Switch Security setting" at block 625, and "Force World Switch" at block 626.

In hypervisor block 221, hypervisor 221 may be configured to manage execution of virtual machines on cloud server 600. Hypervisor 221 may be configured to switch control of processor cores of a cloud server between multiple virtual machines, e.g., through world switches and context switches. In general, hypervisor 221 may be configured to manage the operations of blocks 621-626, to accommodate continuous world switch security for example by receiving a hypervisor setting activation and thereafter checking the hypervisor setting when switching between virtual machines, and forcing world switches for virtual machines for which a hypervisor setting is on.

In "Receive Hypervisor World Switch Security setting Activation For First VM" block 621, hypervisor 221 may be configured to receive a hypervisor setting corresponding to a first virtual machine. Hypervisor 221 may for example be configured to receive a command from task launcher 114 to set hypervisor setting 312. In some embodiments, hypervisor 221 may be configured with a specific interface configured to receive hypervisor setting activation/deactivation commands. Block 621 may be followed by block 622.

In "Execute First VM" block 622, hypervisor 221 may be configured to load and execute a first virtual machine configured to carry out one or more tasks on behalf of a cloud customer. Hypervisor 221 may for example be directed to virtual machine instance 226 and cloud customer applications/data 227 by task launcher 114, and hypervisor 221 may load and execute virtual machine instance 226 and cloud customer applications/data 227. Hypervisor 221 may pass control of one or more processor cores to the first virtual machine, and may monitor and manage execution of the first virtual machine as well as other virtual machines. Block 622 may be followed by block 623.

In "Allow World Switches and Not Context Switches for First VM" block 623, when hypervisor setting 312 is on, hypervisor 221 may be configured to allow world switches, and not context switches, between first virtual machine including a task and other virtual machines executable by cloud server 600. Block 623 may include blocks 624-626.

In "Detect Next VM/VM Switch Command" block 624, during execution of the first virtual machine, hypervisor 221 may be configured to detect a next virtual machine processor command from a next virtual machine and/or any command to switch to a different virtual machine. Hypervisor 221 generally controls context switches and world switches, and therefore in some embodiments block 624 may comprise identifying when a context switch is imminent. Any activity regularly preceding a context switch may be used for detection of an imminent context switch by block 624. Block 624 may be followed by block 625.

In "Refer to Hypervisor World Switch Security setting" block 625, in response to detecting a virtual machine switch in block 624, hypervisor 221 may be configured to refer to a hypervisor setting for one or more of the first virtual machine and the next virtual machine involved in a pending switch. In some embodiments, hypervisor 221 may be configured to refer to a hypervisor setting for both virtual machines involved in a switch, as either virtual machine may have an activated hypervisor setting. In some embodiments, hypervisor 221 may be configured to refer to hypervisor setting for only the first (currently executing) virtual machine, since this accomplishes a security objective of preventing side channel attacks information associated with the first virtual machine. Referring to a hypervisor setting may for example comprise referring to a memory location designated to hold a hypervisor setting. Block 625 may be followed by block 626.

In "Force World Switch" block 626, hypervisor 221 may be configured to perform a world switch instead of a context switch, when a hypervisor setting checked by block 624 is active. In some embodiments, hypervisor 221 may be configured to trap a command such as a next virtual machine processor command when a hypervisor setting is on for one or more of the first virtual machine and the next virtual machine. In some embodiments, hypervisor 221 may be configured to trap a command such as a next virtual machine processor command when a hypervisor setting is on for a first virtual machine.

The operations of FIG. 6 may be performed in real-time, in connection with providing cloud service 112 by data center 110. For example, as may be understood with reference to FIG. 4, operations of FIG. 6 may be performed in data center 110 in response to a cloud service request. Continuous world switch security may thus be turned on and off in cloud server 600 and any other of cloud servers 116 supporting continuous world switch security, dynamically as needed to provide an additional level of security to cloud customers.

Figure 7:
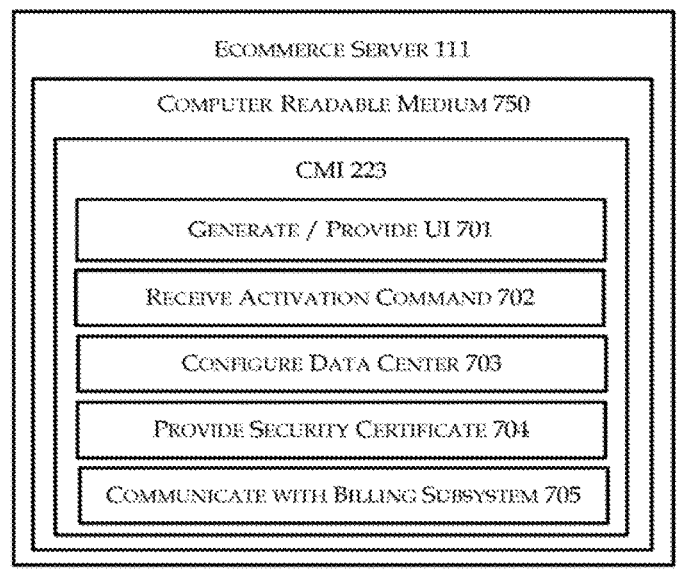
FIG. 7 is a block diagram illustrating an example ecommerce server.

FIG. 7 is a block diagram illustrating an example ecommerce server, computer readable medium, and corresponding methods and modules, arranged in accordance with at least some embodiments of the present disclosure. Example ecommerce server 111 may include one or more operations/modules CMI in block 223, comprising blocks 701-705. The illustrated blocks represent operations as may be performed in a method, functional modules in an ecommerce server 111, and/or instructions as may be recorded on a computer readable medium 750. Example methods according to FIG. 7 may be performed with an electronic commerce server 111 that is configured to provide cloud services to a cloud customer.

In FIG. 7, blocks 701-705 are illustrated as being performed sequentially, with block 701 first and block 705 last. It will be appreciated that the blocks may be re-ordered as convenient to suit particular embodiments, and that these blocks or portions thereof may be performed concurrently in some embodiments. It will also be appreciated that in some examples various blocks may be eliminated, divided into additional blocks, located in separate servers, and/or combined with other blocks.

The illustrated Cloud Management Interface (CMI) block 223 may be arranged to provide functional operations comprising "Generate/Provide UI" at block 701, "Receive Activation Command" at block 702, "Configure Data Center" at block 703, "Provide Security Certificate" at block 704, and "Communicate with Billing Subsystem" at block 705.

In "CMI" block 223, CMI 223 may be configured to manage operations of blocks 701-704, to optionally provide a UI such as cloud customer UI 500 allowing cloud customer activation of continuous world switch security. Cloud customer continuous world switch security activation commands may be received at CMI 223 and CMI 223 may be configured to take appropriate actions to configure data center 110 to implement received continuous world switch security activation commands.

In "Generate/Provide UI" block 701, CMI 223 may be configured to generate and/or retrieve a cloud customer UI such as cloud customer UI 500. A generated cloud customer UI 500 may be provided to a requesting device, for example, to cloud customer device 100. The cloud customer UI 500 may for example be provided as a feature or page within a series of cloud customer UIs configured to facilitate cloud customer management of cloud services.

The cloud customer UI 500 may comprise one or more continuous world switch security controls 501-503, as well as price information 510. Continuous world switch security controls 501, 502, 503 may be configured to receive continuous world switch security activation commands associated with one or more tasks to be performed by one or more cloud servers configured to provide cloud services. Some activation commands may further include conditions under which an activation command is to be carried out, as described herein, and a cloud customer UI may comprise a field and/or selectable elements configured to receive cloud customer condition specifications.

Cloud customer control 504 may also be included in cloud customer UI 500. Cloud customer control 504 may be configured to allow tasks associated with a cloud customer to execute on a cloud server that also executes tasks having an activated continuous world switch security. Block 701 may be followed by block 702.

In "Receive Activation Command" block 702, CMI 223 may be configured to receive activation commands from cloud customer UI 500. Cloud customer UI 500 may for example send activation command information to ecommerce server 111 upon finalization of cloud customer selections. CMI 223 may receive and interpret received activation commands for use in block 703. Block 702 may be followed by block 703.

In "Configure Data Center" block 703, in response to receiving continuous world switch security activation commands in block 702, CMI 223 may be arranged to configure one or more of cloud servers 116 of data center 110 to allow world switches, and not context switches, between a virtual machine executing tasks to which the received activation commands apply, e.g., tasks on behalf of a cloud customer providing an activation command, and other virtual machines executable by one or more of cloud servers 116, e.g., virtual machines that execute tasks on behalf of other cloud customers.

In some embodiments, a continuous world switch security activation command may be applied to all tasks to be performed by cloud servers on behalf of a cloud customer. In some embodiments, an activation command may be applied to only certain specific tasks or task types. As described above, task types subject to continuous world switch security may be identified by task metadata such as metadata identifying a task as having elevated security, or being related to health care, financial records, or other sensitive information.

In some embodiments, block 703 may comprise generating an administrative record, which may for example include a digital certificate, associated with a cloud customer. The generated administrative record may include a world switch indicator. Task launcher 114 may be configured to respond to a world switch indicator when executing tasks in the course of providing cloud services, by activating a hypervisor setting, subject to any specified conditions, in a hypervisor configured to manage the execution of virtual machines by one or more of cloud servers 116, as described herein. Load balance manager 113 may also be configured to respond to a world switch indicator as described herein. Block 703 may be followed by block 704.

In "Provide Security Certificate" block 704, CMI 223 may be configured to provide a security certification to a cloud customer who activates continuous world switch security. A digital security certificate may for example be provided as described in connection with FIG. 5. Block 704 may be followed by block 705.

In "Communicate with Billing Subsystem" block 705, CMI 223 may be configured to communicate continuous world switch security information to billing subsystem 406. Continuous world switch security information may comprise, for example, prices corresponding to activation commands received via block 702.

Figure 8:
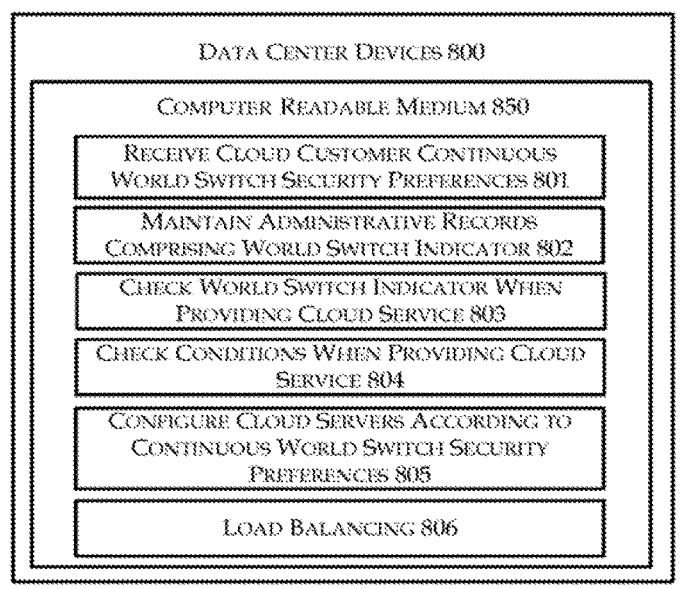
FIG. 8 is a block diagram illustrating example data center devices, all arranged in accordance with at least some embodiments of the present disclosure.

FIG. 8 is a block diagram illustrating example data center devices, computer readable media, and corresponding methods and modules, arranged in accordance with at least some embodiments of the present disclosure. Example data center devices 800 may comprise, for example, any combination of devices illustrated in FIG. 1-FIG. 4, FIG. 6, and/or FIG. 7. The Example data center devices 800 may include one or more operations/modules in blocks 801-806. The illustrated blocks represent operations as may be performed in a method, functional modules in data center devices 800, and/or instructions as may be recorded on a computer readable medium 850. Example methods according to FIG. 8 may be performed with one or more interconnected servers of a data center 110 configured to provide a cloud service.

In FIG. 8, blocks 801-806 are illustrated as being performed sequentially, with block 801 first and block 806 last. It will be appreciated that the blocks may be re-ordered as convenient to suit particular embodiments, and that these blocks or portions thereof may be performed concurrently in some embodiments. It will also be appreciated that in some examples various blocks may be eliminated, divided into additional blocks, located in separate servers, and/or combined with other blocks.

The illustrated blocks 801-806 may be arranged to provide functional operations comprising "Receive Cloud Customer Continuous World Switch Security Preferences" at block 801, "Maintain Administrative Records Comprising World Switch Indicator" at block 802, "Check World Switch Indicator When Providing Cloud Service" at block 803, "Check Conditions When Providing Cloud Service" at block 804, "Configure Cloud Servers According to Continuous World Switch Security Preferences" at block 805, and "Load Balancing" at block 806.

In general, blocks 801-806 comprise blocks configured to provide an optional continuous world switch security level in a data center. It will be appreciated with the benefit of this disclosure that numerous additional blocks and features may be employed in some embodiments.

In "Receive Cloud Customer Continuous World Switch Security Preferences" block 801, data center devices 800 may be configured to receive cloud management data as described herein, including, inter alia, blocks of FIG. 7. Block 801 may be followed by block 802.

In "Maintain Administrative Records Comprising World Switch Indicator" block 802, data center devices 800 may be configured to maintain, for example by storing and updating, digital administrative records such as administrative records 115 comprising one or more world switch indicators, such as world switch indicator 311, wherein the world switch indicators are associated with one or more cloud customers. Digital administrative records 115 may be updated for example when new preferences are received in block 801. Furthermore, block 802 may be configured to communicate continuous world switch security information to a billing subsystem 406. Block 802 may be followed by block 803.

In "Check World Switch Indicator When Providing Cloud Service" block 803, data center devices 800 may comprise a task launcher configured to check for a world switch indicator when launching a task on behalf of a cloud customer. Block 803 may be followed by block 804.

In "Check Conditions When Providing Cloud Service" block 804, data center devices 800 may comprise a task launcher configured to check at least one condition, in addition to a world switch indicator, prior to activating a hypervisor setting. The task launcher may activate a hypervisor setting when the condition is satisfied, as discussed herein. Block 804 may be followed by block 805.

In "Configure Cloud Servers According to Continuous World Switch Security Preferences" block 805, data center devices 800 may comprise a task launcher configured to activate a hypervisor setting for a virtual machine managed by a hypervisor 221 of one or more of the cloud servers 116 in response to an indication that continuous world switch security is on, e.g., as determined from world switch indicator 311.

The data center devices 800 may include one or more hypervisors such as hypervisor 221 configured to initiate context switches and world switches between virtual machines executable by one or more cloud servers. Hypervisor 221 may be configured to implement hypervisor settings such as hypervisor setting 312, so that when a hypervisor setting is on, hypervisor 221 is configured to allow world switches, and not context switches, between a virtual machine including a task and other virtual machines executable by the one or more processor cores of a cloud server including hypervisor 221. When a hypervisor setting is off, hypervisor 221 may be configured to allow world switches and context switches between a virtual machine including a task and other virtual machines executable by one or more processor cores of a cloud server. Block 805 may be followed by block 806.

In "Load Balancing" block 806, data center devices 800 may be configured to perform one or more of a variety of load balancing operations, in addition to standard load balancing, wherein load balancing operations according to this disclosure are configured to accommodate tasks subject to continuous world switch security. For example, in some embodiments load balancing may allocate additional processing resources including one or more of servers, processing time, processor cores, and memory resources to virtual machines including tasks for which continuous world switch security is on. In some embodiments, load balancing may group tasks for which continuous world switch security is on in same servers. In some embodiments, load balancing may allocate tasks for which continuous world switch security is on in servers comprising a hardware virtualization assistance tool in one or more processor cores thereof.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to: physically connectable and/or physically interacting components; wirelessly connectable and/or wirelessly interacting components; and/or logically connectable and/or logically interacting components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method performed with an electronic commerce server configured to provide cloud services to a cloud customer, the method comprising:

provinding, by the electronic commerce server, a cloud customer user interface (UI) that comprises a continuous world switch security control, wherein the continuous world switch security control is configured to receive a continuous world switch security activation command to activate continuous world switch security for one or more tasks to be performed by one or more virtual machines configured to execute the one or more tasks at one or more cloud servers configured to provide the cloud services;

in response to receiving, by the electronic commerce server via the continuous world switch security control in the cloud customer UI, the continuous world switch security activation command, configuring one or more hypervisors at the one or more cloud servers to allow world switch, and not context switch, between the one or more virtual machines and one or more subsequent virtual machines configured to execute subsequent tasks; and during execution of the one or more tasks by the one or more virtual machines, performing, by the one or more cloud servers, one or more world switches between the one or more virtual machines and the one or more subsequent virtual machines, wherein each world switch of the one or more world switches eliminates at least a processor core cache, register, or pipeline state associated with the one or more virtual machines when switching to execution of the one or more subsequent virtual machines, and wherein each context switch allows at least a portion of a processor state associated with the one or more virtual machines to remain during execution of the one or more subsequent virtual machines.

2. The method of claim 1, wherein the continuous world switch security activation command is applied to all tasks to be performed by the one or more virtual machines on behalf of the cloud customer.

3. The method of claim 1, wherein configuring the one or more hypervisors at the one or more cloud servers to allow world switch, and not context switch, comprises generating an administrative record associated with the cloud customer, the administrative record including a world switch indicator.

4. The method of claim 3, wherein configuring the one or more hypervisors at the one or more cloud servers to allow world switch, and not context switch, further comprises activating, by a task launcher executed at the one or more cloud servers, a hypervisor world switch security setting for the one or more hypervisors.

5. The method of claim 1, wherein configuring the one or more hypervisors at the one or more cloud servers to allow world switch, and not context switch, comprises generating an administrative record comprising a digital certificate associated with the cloud customer, the digital certificate including a world switch indicator.

6. The method of claim 1, further comprising providing, in the cloud customer UI, price information to activate the continuous world switch security.

7. The method of claim 1, wherein configuring the one or more hypervisors at the one or more cloud servers to allow world switch, and not context switch, comprises configuring the one or more hypervisors at the one or more cloud servers to allow world switch, and not context switch, at an individual cloud server when virtual machines associated with multiple cloud customers are executed at the individual cloud server.

8. The method of claim 1, further comprising load balancing to allocate additional cloud servers, additional processing time, additional processor cores, or additional memory resources to the one or more virtual machines.

9. The method of claim 1, further comprising allocating tasks for which continuous world switch security is activated to cloud servers comprising hardware virtualization assistance.

10. The method of claim 1, further comprising allocating tasks for cloud customers associated with activated continuous world switch security to one or more same cloud servers.

11. The method of claim 1, further comprising providing, in the cloud customer UI, a control configured to allow cloud customer tasks to execute on cloud servers that also execute tasks having activated continuous world switch security.

12. The method of claim 1, further comprising providing a security certification to the cloud customer, wherein the security certification certifies that the cloud customer activated the continuous world switch security.

13. An ecommerce server configured to interact with a cloud customer, the ecommerce server comprising:
a processor;
a memory;
a communication device; and
a cloud management interface loadable in the memory and executable by the processor, wherein the cloud management interface is configured to provide a cloud customer user interface (UI) via the communication device, the cloud customer UI comprising a continuous world switch security control, wherein the continuous world switch security control is configured to receive an activation command to activate continuous world switch security for one or more tasks to be performed by one or more virtual machines configured to execute the one or more tasks at one or more cloud servers;
wherein in response to receipt of the activation command via the continuous world switch security control in the cloud customer UI, the cloud management interface is configured to arrange one or more hypervisors at the one or more cloud servers to allow world switch, and not context switch, between the one or more virtual machines and one or more subsequent virtual machines configured to execute subsequent tasks; and
wherein the one or more cloud servers are configured to perform, during execution of the one or more tasks by the one or more virtual machines, one or more world switches between the one or more virtual machines and the one or more subsequent virtual machines, wherein each world switch of the one or more world switches eliminates at least a processor core cache, register, or pipeline state associated with the one or more virtual machines when switching to execution of the one or more subsequent virtual machines, and wherein each context switch allows at least a portion of a processor state associated with the one or more virtual machines to remain during execution of the one or more subsequent virtual machines.

14. The ecommerce server of claim 13, wherein the activation command is associated with the cloud customer and all tasks to be performed by the one or more virtual machines on behalf of the cloud customer.

15. The ecommerce server of claim 13, wherein arrangement of the one or more hypervisors at the one or more cloud servers to allow world switch, and not context switch, comprises generation of an administrative record associated with the cloud customer, the administrative record including a world switch indicator.

16. The ecommerce server of claim 13, wherein arrangement of the one or more hypervisors at the one or more cloud servers to allow world switch, and not context switch, comprises generation of an administrative record comprising a digital certificate associated with the cloud customer, the digital certificate including a world switch indicator.

17. The ecommerce server of claim 13, wherein the ecommerce server is configured to provide, in the cloud customer UI, price information to activate the continuous world switch security.

18. The ecommerce server of claim 13, wherein the ecommerce server is configured to provide, in the cloud customer UI, a control configured to allow cloud customer tasks to execute the one or more on cloud servers that also execute tasks having activated continuous world switch security.

19. The ecommerce server of claim 13, wherein the ecommerce server is configured to provide a security certification to the cloud customer, wherein the security certification certifies that the cloud customer activated the continuous world switch security.

20. A non-transitory computer readable storage medium having computer executable instructions executable by a processor, wherein the instructions, in response to execution by the processor, cause the processor to:
provide a cloud customer user interface (UI) that comprises a continuous world switch security control, wherein the continuous world switch security control is configured to receive a continuous world switch security activation command to activate continuous world switch security for one or more tasks to be performed by one or more virtual machines configured to execute the one or more tasks at one or more cloud servers configured to provide the cloud services; and
configure one or more hypervisors at the one or more cloud servers to allow world switch, and not context switch, between the one or more virtual machines and one or more subsequent virtual machines configured to execute subsequent tasks, wherein the configuration is in response to receipt, via the continuous world switch security control in the cloud customer UI, of the continuous world switch security activation command,
wherein the one or more cloud servers are configured to perform, during execution of the one or more tasks by the one or more virtual machines, one or more world switches between the one or more virtual machines and the one or more subsequent virtual machines, wherein each world switch of the one or more world switches eliminates at least a processor core cache, register, or pipeline state associated with the one or more virtual machines when switching to execution of the one or more subsequent virtual machines, and wherein each context switch allows at least a portion of a processor state associated with the one or more virtual machines to remain during execution of the one or more subsequent virtual machines.

\* \* \* \* \*

UNITED STATES PATENT AND TRADEMARK OFFICE
CERTIFICATE OF CORRECTION

PATENT NO. : 9,652,272 B2  
APPLICATION NO. : 14/301172  
DATED : May 16, 2017  
INVENTOR(S) : Kruglick Page 1 of 1

It is certified that error appears in the above-identified patent and that said Letters Patent is hereby corrected as shown below:

In the Specification

In Column 24, Line 45, delete "CMI in block 223," and insert -- in CMI block 223, --, therefor.

In the Claims

In Column 32, Line 52, in Claim 18, delete "execute the one or more on cloud servers that also execute" and insert -- execute on cloud servers that also execute the one or more --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*